United States Patent Office 3,509,108
Patented Apr. 28, 1970

3,509,108
PREPARATION OF POLYBENZIMIDAZOLES
Arthur E. Prince, Basking Ridge, N.J., assignor to Celanese Corporation, New York, N.Y., a corporation of Delaware
No Drawing. Continuation-in-part of application Ser. No. 520,645, Jan. 14, 1966. This application Mar. 4, 1969, Ser. No. 804,316
Int. Cl. C08g 33/02
U.S. Cl. 260—78.4     13 Claims

ABSTRACT OF THE DISCLOSURE

Aromatic polybenzimidazoles are prepared by a one stage polymerization process which comprises conducting the initial reaction at a temperature above 200° C. and a pressure above 50 p.s.i., and thereafter further heating the resulting reaction product at a temperature above 300° C.

Cross reference to related applications

This application is a continuation-in-part of my copending application Ser. No. 520,645, filed Jan. 14, 1966, now abandoned.

Background of the invention

This invention relates to aromatic polybenzimidazoles and to processes for preparing the same.

Polybenzimidazoles, and particularly aromatic polybenzimidazoles, are characterized by a high degree of thermal stability. They may be shaped to form fibers, films, and other articles of wide utility which show resistance to degration by heat, hydrolytic media and oxidizing media.

As described in U.S. Patent No. 2,895,948, the aliphatic polybenzimidazoles may be prepared by a one stage, atmospheric pressure process. When this process is applied to the preparation of aromatic polybenzimidazoles, however, unsatisfactory results such as an intractable foamed structure are obtained.

As described in U.S. Re. Patent No. 26,065, the aromatic polybenzimidazoles may be prepared by a two stage, reduced pressure process. Several disadvantages, however, result from this multi-stage process.

For example, compensation must be made for the foaming which occurs in the first reactor and, thus, efficient utilization of a reactor of a given size is seriously limited and, further, poor heat transfer often results.

Further, in the multi-stage process two reactors, and a grinder for pulverizing the foamed reaction product of the first stage, are required, with, of course, additional power requirements.

Moreover, it has been found that an excessive amount of insoluble polymer species, namely gels and insolubles, are formed during such a two stage reduced pressure process.

Summary of the invention

Accordingly, the primary object of the present invention is to provide a process for the preparation of aromatic polybenzimidazoles, which process eliminates or substantially alleviates the above-mentioned disadvantages of prior art processes.

Another object of the present invention is to provide aromatic polybenzimidazoles which, when dissolved in a solvent such as dimethylacetamide, contains less insoluble species, that is, gels and insolubles, as compared to a similar solution formed from a corresponding polymer product produced by the prior art two stage reduced pressure process.

Other objects and advantages of the present invention will be apparent from the following description.

In accordance with the present invention, aromatic polybenzimidazoles are prepared in a one stage process by initially reacting the monomer or monomers in a melt phase polymerization at a temperature above 200° C. and a pressure above 50 p.s.i., and then heating the resulting reaction product in a solid state polymerization at a temperature above 300° C. to yield the final aromatic polybenzimidazole product.

To prevent unwanted oxidation, both the melt polymerization and the following solid state polymerization are conducted under substantially oxygen-free conditions.

The essence of the present invention is the discovery that conducting the initial reaction, i.e., the melt phase or stage, at a pressure above 50 p.s.i., preferably between 65 p.s.i. and 1,000 p.s.i., and most preferably between 300 p.s.i. and 600 p.s.i., eliminates the foaming encountered in prior art processes. It is believed that when the reactants have melt polymerized to a prepolymer form, the prepolymer precipitates out in the form of fine particles which undergo a solid state polymerization during the heating at temperatures above 300° C., i.e., the post heating period.

Most preferably, the volatile by-products of the reaction are removed prior to or during this post heating period. This may be done by lowering the pressure on the resulting initial reaction mixture and venting the by-products from the reaction zone, or by passing a stream of an inert gas such as nitrogen in contact with the resulting initial reaction product to remove the volatile by-products, or a combination of both may be used.

Another aspect of the present invention is the discovery that the mixing of free phenol with the reactant monomer or monomers used in the present invention results in a polybenzimidazole of higher inherent viscosity (an indication of higher molecular weight) which is advantageous in the formation of polybenzimidazole fibers or filaments.

Other materials which may be similarly employed in lieu of all or a portion, e.g., five to ninety-five weight percent, of phenol are diphenyl ether, biphenyl, and the cresols such as m-cresol.

Description of the preferred embodiments

Aromatic polybenzimidazoles are a known class of heterocyclic polymers, which consist essentially of recurring units of the following Formulas I and II. Formula I is:

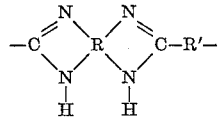

wherein R is a tetravalent aromatic nucleus, with the nitrogen atoms forming the benzimidazole rings being paired upon adjacent carbon atoms, i.e., ortho carbon atoms, of the aromatic nucleus, and R' is a member of the class consisting of an aromatic ring and a heterocyclic ring such as pyridine, pyrazine, furan, quinoline, thiophene, and pyran.

Formula II is:

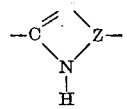

wherein Z is an aromatic nucleus having the nitrogen atoms forming the benzimidazole ring paired upon adjacent carbon atoms of the aromatic nucleus.

Any of the above aromatic polybenzimidazoles represented by the Formulas I and II may be prepared according to the process of the present invention.

The aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the auto-condensation of phenyl-3,4-diaminobenzoate.

The aromatic polybenzimidazoles having the recurring units of Formula I may be prepared by condensing an aromatic tetraamine compound containing a pair of orthodiamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the class consisting of pyridine, pyrazine, furan, quinoline, thiophene and pyran and (c) an anhydride of an aromatic dicarboxylic acid.

The following generalized equation illustrates the condensation reaction which occurs in forming the polybenzimidazoles having the recurring units of Formula I (R and R' are aromatic):

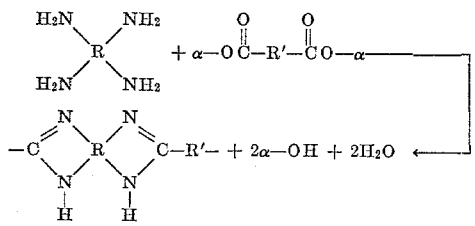

Suitable R aromatic radicals are a single aromatic ring such as

1,2,4,5-phenylene; a polynuclear fused aromatic ring such as

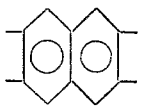

2,3,6,7-naphthylene; and a polynuclear aromatic ring such as

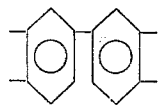

3,3',4,4'-biphenylene or

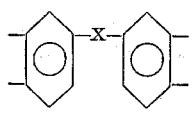

wherein X is

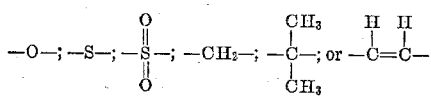

The aromatic R' (divalent) radical may also be a single aromatic ring; fused polynuclear aromatic rings; or polynuclear aromatic rings such as described above with respect to the tetraamine derived (tetravalent) R radical.

These R' aromatic compounds, which are derived from corresponding diphenyl esters of aromatic dicarboxylic acids or anhydrides of the acids, and the tetraamines may be further substituted with small non-reactive substituents on the aromatic nuclei. Thus, the aromatic nuclei may additionally bear lower alkyl groups as methyl or ethyl substituents, lower alkoxy groups as methoxy or ethoxy substituents or other similar small substituents which are not capable of reaction, under the conditions of condensation with the ortho diamino reactive centers or with the carboxylic acid reactive centers. Mixtures of the various tetraamines and dicarboxyl compounds may be used to form copolymers.

Examples of polybenzimidazoles which have the recurring structure of Formula I and which may be prepared according to the process of the present invention include:

poly-2,2'-(m-phenylene) 5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene 4",4''')-5,5'-bibenzimidazole;
poly-2,6-(m-phenylene)-diimidazobenzene;
poly-2,2' (m-phenylene)-5,5'-di(benzimidazole)ether;
poly-2,2' (m-phenylene-5,5'-di(benzimidazole)sulfide;
poly-2,2' (m-phenylene)-5,5'-di(benzimidazole)sulfone;
poly-2,2' (m-phenylene)-5,5'-di(benzimidazole)-methane;
poly-2',2" (m-phenylene)-5',5" di(benzimidazole)-propane-2,2; and
poly-2',2" (m-phenylene)-5',5" di(benzimidazole)-ethylene-1,2 where the double bonds of the ethylene groups are intact in the final polymer.

Preferably, equimolar quantities of the monomeric tetraamine and dicarboxyl compound are introduced into a melt polymerization reaction zone and heated therein at a temperature above about 200° C., preferably 225° C. to 500° C., and more preferably from about 300° C. to 450° C.

As stated, the reaction may be conducted in the presence of phenol, also known or referred to as hydroxybenzene, benzophenol, phenylic acid, or carbolic acid, and which may be represented by the following structural formula:

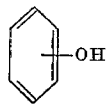

Phenol normally has a melting point of about 43° C., a normal boiling point of about 182° C., and can be obtained in such physical forms as a fused solid, crystals, or liquid, in several grades of purification, e.g., 82%, 90%, or 95% phenol, with the remainder mostly cresols, being available.

The phenol may be mixed with the reactant monomers in an amount of about 25 to 500 percent, preferably about 50 to 300 percent, and most preferably about 50 to 150 percent, based on the weight of the final polymer product.

The manner in which the phenol is obtained, i.e., made, derived, or recovered, is well known and not a part of the present invention.

As stated above, the melt phase of the reaction is conducted at a pressure sufficient to prevent foaming. This pressure, which may be autogenous, has been found to be above 50 p.s.i., preferably is between 65 p.s.i. and 1,000 p.s.i., and most preferably is between 300 p.s.i. and 600 p.s.i. at maximum reaction pressure.

For example, the monomer or monomers may be charged to an autoclave which is then purged of oxygen with an inert gas such as nitrogen. Upon heating, the reaction will be initiated at about 200° C. and be evidenced by marked increase in reaction temperature and pressure as the monomers melt and the reaction ensues.

As external heating is maintained, the batch temperature will rise and the pressure autogenously increases. The pressure may be allowed to increase freely to a maximum within the ranges indicated above, or the volatiles may be vented in a semi-continuous or continuous manner so as to maintain somewhat lower pressure within the ranges indicated above.

Once the melt phase of the polymerization reaction has been essentially completed, which normally takes a few minutes to several hours, e.g., two minutes to two hours, or more, depending upon the external heating rate, any remaining volatile by-products of the reaction are vented from the reaction zone and the prepolymer subjected to a solid state polymerization by further heating above 300° C., preferably between 350° C. and 500° C. to yield the final polybenzimidazole polymer product, which desirably has an inherent viscosity (I.V.) of at least 0.5, e.g., 0.6 to 1.1, or more.

The volatile by-products of the reaction are preferably removed from the reaction zone in the solid state phase of the polymerization by lowering the pressure to below 25 p.s.i., and preferably between about atmospheric pressure and 25 p.s.i., and most preferably to substantially atmospheric pressure, by venting the evolved volatile by-products.

Concurrently or alternatively, i.e., at higher or lowered pressure, the reaction zone may be swept with a stream of an inert gas such as nitrogen to facilitate the removal of the volatile by-products of the reaction.

For example, the nitrogen or other inert gas, which if desired can be preheated, may be introduced into the reaction zone at a rate of flow measured at standard conditions, i.e., atmospheric pressure and temperature, in the range of from about 1 to 200 percent of the volume of the reaction zone per minute.

The duration of the solid state phase of the reaction is normally of a few seconds to several hours, e.g., 8 hours or more, and is preferably about .25 to 5 hours, and most preferably about .5 to 3 hours.

To prevent oxidation, the above described reaction sequence, i.e., the melt plus solid state polymerization, is conducted in a substantially oxygen-free atmosphere, i.e., below about 20 p.p.m. oxygen and preferably below about 8 p.p.m. oxygen.

The inherent viscosity (I.V.) as used in the present specification and claims is determined from a solution of 0.4 gram of the polymer in 100 ml. of 97% $H_2SO_4$ at 25° C., and is expressed as deciliters per gram.

The invention is additionally illustrated in connection with the following examples wherein the preferred polybenzimidazole polymer is used, namely, poly-2,2'-(m-phenylene)-5,5'-bibenzimidazole, the recurring unit of which is

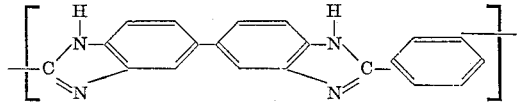

EXAMPLE I 243 grams of 3,3'-diaminobenzidine and 361 grams of diphenylisophthalate were charged to a one-gallon agitated autoclave and purged of air by excavating three times and filling with nitrogen. The heating cycle was initiated with agitation and a flow of 2 standard cubic feet per hour (SCFH) of nitrogen through the autoclave was maintained untail a batch temperature of 106° C. was reached. The flow was then terminated; the autoclave sealed, and the heating cycle continued. Reaction occurred above 200° C. with autogenous pressure rising to 500 p.s.i. at a batch temperature of 335° C. The pressure was then lowered to about atmospheric pressure by venting over a 10 minute period at such a rate so as to maintain the batch temperature at about 337° C. The autoclave was then swept with 2 SCFH of nitrogen as the batch temperature was raised from 337° C. to 392° C. in the next half hour and then to 405° C. in the following four hours. The autoclave was then cooled and the polymer product discharged as a free flowing powder.

The yield of polymer product was 346.1 grams (98.9% yield based on the charge of reactants). Analysis for percent C, H, N and O as well as TGA and infrared analysis indicated the product to be poly-2,2'-(m-phenylene)-5,5'-bibenzimidazole. The inherent viscosity of the polymer was 0.58. The product in an amount of greater than 98 percent by weight of the solvent was soluble in boiling dimethylacetamide.

EXAMPLE II 243 grams of 3,3'-diaminobenzidine, 361 grams of diphenylisophthalate, and 350 grams of phenol were charged to the one-gallon autoclave and purged as in Example I. The heating cycle was initiated with agitation and a flow of 2 SCFH of nitrogen until a batch temperature of 114° C. was reached. The flow was then terminated; the autoclave sealed, and the heating cycle continued. Reaction occurred above 200° C. with autogenous pressure rising to 500 p.s.i. at a batch temperature of about 337° C. The pressure was vented to about atmospheric over a 40 minute period at such a rate so as to maintain the batch temperature at 337° C. The batch was then swept with 2 SCFH of nitrogen. The batch temperature rose from 337° C. to 391° C. in the next half hour and to 404° C. in the following three hours. The autoclave was then cooled and the polymer, poly-2,2'-(m-phenylene)-5,5'-bibenzimidazole, discharged as a free flowing powder free of phenol.

The inherent viscosity of the polymer was 0.69, which, when compared to the I.V. of the polymer obtained in Example I, indicated that the added free phenol was beneficial in increasing the molecular weight of the polymer product.

EXAMPLE III 243 grams of 3,3'-diaminobenzidine and 361 grams diphenylisophthalate are charged to a one-gallon agitated (50 r.p.m.) pressure autoclave and purged of all air with deoxygenated nitrogen followed by a constant flow of 3 SCFH of nitrogen through the reactor. After the initiation of the heating cycle the sweep is terminated and the reactor sealed off from the atmosphere when a wall temperature of 250° C. is reached (about one hour). Maintaining heating, reaction ensues shortly thereafter with a resultant pressure rise to 345 p.s.i. at a maximum wall temperature of 365° C. This pressure is then gradually reduced by venting over a 15 minute interval to atmospheric pressure at which point a flow of 3 SCFH of nitrogen is again reinstated for a period of four hours, after which the heating at 365° C. is terminated and the batch is cooled. The polymer upon discharging from the reactor is in the form of a fine powder and has an inherent viscosity of 0.63.

The yield of polymer is 96.5% (337.5 grams). Analysis for percent C, H, N and O as well as infrared analysis conclusively indicates the product to be poly-2,2'-(m-phenylene)-5,5'-bibenzimidazole.

EXAMPLE IV 243 grams of 3,3'-diaminobenzidine and 361 grams diphenylisophthalate and 350 grams phenol are charged to a reactor. After purging and initiating the heating cycle the reactor is again purged at a temperature of 150° C. The heating cycle is then continued with the vessel sealed off from the atmosphere. A wall temperature of 250° C. is reached in about an hour followed shortly by the onset of reaction with a rise in pressure to 525 p.s.i. at a wall temperature of 390° C. Heating is terminated and the pressure is then bled gradually over a fifteen minute interval to atmospheric pressure at which point a flow of 3 SCFH of nitrogen is again reinstated for a post-heating period of four hours. The polymer, poly-2,2'-(m-phenylene)-5,5'bibenzimidazole, upon discharging is in the form of a powder with a yield of 97.5% (338 grams) and an inherent viscosity of 0.71.

The polymers of the present invention may be dissolved in a suitable solvent, e.g., dimethylacetamide, dimethylformamide, or dimethylsulfoxide, to form a spinning or casting solution which may be fabricated into filaments or films. After suitable post treatments such as drawing and heating, the filaments may be knitted or woven into fabrics having excellent high temperature properties and are useful in applications such as space suits, parachutes, and the like.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A process for the preparation of aromatic polybenzimidazoles which comprises
    (I) reacting, under substantially oxygen-free conditions, at a temperature above 200° C., and a pressure above 50 p.s.i., a member of the class consisting of
        (A) an aromatic compound containing ortho disposed diamino substituents and a phenylcarboxylate ester substituent and
        (B) a mixture of
            (1) an aromatic tetraamino compound containing a pair of orthodiamino substituents on the aromatic nucleus and
            (2) a member of the class consisting of
                (a) the diphenyl ester of an aromatic dicarboxylic acid,
                (b) the diphenyl ester of a heterocyclic dicarboxylic acid wherein the carboxyl groups are substituents upon carbon in a ring compound selected from the class consisting of pyridine, pyrazine, furan, quinoline, pyran and thiophene, and
                (c) an anhydride of an aromatic dicarboxylic acid
    and then
    (II) heating the resulting reaction product under substantially oxygen-free conditions at a temperature above 300° C. to yield an aromatic polybenzimidazole.

2. The process of claim 1 wherein
    (i) in step (I) the pressure is between 65 p.s.i. and 1,000 p.s.i., and the reaction time is from two minutes to two hours, and
    (ii) in step (II) the pressure is below 25 p.s.i. and the heating period is from 0.25 to 5 hours.

3. The process of claim 1 wherein an aromatic tetraamino compound selected from the group consisting of 3,3'-diaminobenzidine and 1,2,4,5-tetraaminobenzene is employed.

4. The process of claim 1 wherein an equimolar mixture of 3,3'-diaminobenzidine and diphenylisophthalate is employed.

5. The process of claim 4 wherein the pressure in step (I) is between 300 p.s.i. and 600 p.s.i. at maximum reaction temperature.

6. The process of claim 1 which further comprises mixing with the reactants of step (I) at least twenty-five percent by weight, based on the weight of the product aromatic polybenzimidazole, of a material selected from the group consisting of phenol, diphenyl ether, biphenyl, and cresol.

7. A process for the preparation of aromatic polybenzimidazole which comprises
    (I) reacting, at a temperature between 225° C. and 500° C., under autogenous pressure and substantially oxygen-free conditions, a member of the class consisting of
        (A) an aromatic compound containing ortho disposed diamino substituents and a phenylcarboxylate ester substituent and
        (B) a mixture of
            (1) an aromatic tetraamino compound containing a pair of orthodiamino substituents on the aromatic nucleus and
            (2) a member of the class consisting of
                (a) the diphenyl ester of an aromatic dicarboxylic acid,
                (b) the diphenyl ester of a heterocyclic dicarboxylic acid wherein the carboxyl groups are substituents upon carbon in a ring compound selected from the class consisting of pyridine, pyrazine, furan, quinoline, pyran and thiophene, and
                (c) an anhydride of an aromatic dicarboxylic acid
    (II) passing a stream of inert gas into contact with the resulting reaction product of step (I) to remove volatile by-products of the reaction, and
    (III) heating the reaction product under substantially oxygen-free conditions at temperatures between 350° and 500° C. to yield an aromatic polybenzimidazole.

8. The process of claim 7 wherein the autogenous pressure in step (I) is between 65 p.s.i. and 1,000 p.s.i. at maximum reaction temperature, and the pressure in step (III) is between substantially atmospheric pressure and 25 p.s.i.

9. The process of claim 8 which further comprises mixing with the reactants of step (I) at least twenty-five percent by weight phenol, based on the weight of the final aromatic polybenzimidazole product.

10. The process of claim 7 wherein an equimolar mixture of 3,3'-diaminobenzidine and diphenylisophthalate is employed, and wherein the product artmoatic polybenzimidazole has an inherent viscosity of at least 0.5 as determined from a solution of 0.4 gram of the product aromatic polybenzimidazole in 100 ml. of 97 percent $H_2SO_4$ at 25° C.

11. A process for the preparation of aromatic polybenzimidazoles which comprises
    (I) reacting under substantially oxygen-free conditions and at temperatures between 300° C. and 450° C. and at pressures between 65 p.s.i. and 1,000 p.s.i. a member of the class consisting of
        (A) an aromatic compound containing ortho disposed diamino substituents and a phenylcarboxylate ester substituent and
        (B) a mixture of
            (1) an aromatic tetraamino compound containing a pair of orthordiamino substituents on the aromatic nucleus and
            (2) a member of the class consisting of
                (a) the diphenyl ester of an aromatic dicarboxylic acid,
                (b) the diphenyl ester of a heterocyclic dicarboxylic acid wherein the carboxyl groups are substituents upon carbon in a ring compound selected from the class consisting of pyridine, pyrazine, furan, quinoline, pyran and thiophene, and
                (c) an anhydride of an aromatic dicarboxylic acid,
    to yield a solid prepolymer reaction product,
    (II) lowering the pressure on the resulting prepolymer reaction product to between substantially atmospheric pressure and 25 p.s.i.,
    (III) passing a stream of inert gas in contact with the reaction product to remove volatile by-products of the reaction, and (IV) heating the reaction product under substantially oxygen-free conditions at temperatures between 350° C. and 500° C. to yield an aromatic polybenzimidazole.

12. The process of claim 11 wherein the pressure in step (I) is between 300 p.s.i. and 600 p.s.i. at maximum reaction temperature, and wherein the pressure in step (IV) is substantially atmospheric.

13. The process of claim 12 wherein a substantially equimolar mixture of 3,3′-diaminobenzidine and diphenylisophthalate is reacted in step (I) for a period of time between 2 minutes and two hours, and wherein the product aromatic polybenzimidazole has an inherent viscosity of at least 0.5 as deterimned from a solution of 0.4 gram of the product aromatic polybenzimidazole in 100 ml. of 97 percent $H_2SO_4$ at 25° C.

References Cited

UNITED STATES PATENTS

| | | | |
|---|---|---|---|
| Re. 26,065 | 7/1966 | Marvel et al. | 260—47 |
| 3,174,947 | 3/1965 | Marvel et al. | 260—47 |
| 3,301,828 | 1/1967 | Marvel | 260—78.4 |

WILLIAM H. SHORT, Primary Examiner

L. L. LEE, Assistant Examiner

U.S. Cl. X.R.

260—47, 48